(12) United States Patent
Barlow

(10) Patent No.: US 7,251,082 B2
(45) Date of Patent: Jul. 31, 2007

(54) PHOTOCHROMIC/VITROCERAMIC WINDOW ASSEMBLY

(76) Inventor: Galen W. Barlow, 9819 Cahart Pl., Silver Spring, MD (US) 20903

( * ) Notice: Subject to any disclaimer, the term of this patent is extended or adjusted under 35 U.S.C. 154(b) by 4 days.

(21) Appl. No.: 11/296,500

(22) Filed: Dec. 8, 2005

(65) Prior Publication Data

US 2007/0133105 A1   Jun. 14, 2007

(51) Int. Cl.
- *G02B 15/14* (2006.01)
- *C03C 15/00* (2006.01)
- *B32B 27/00* (2006.01)

(52) U.S. Cl. .............. 359/707; 65/30.11; 428/426

(58) Field of Classification Search ............ 359/707; 65/30.11
See application file for complete search history.

(56) References Cited

U.S. PATENT DOCUMENTS 5,694,240 A * 12/1997 Sternbergh ............ 359/359
6,547,390 B1 * 4/2003 Bernheim et al. .......... 351/163
2005/0068629 A1 * 3/2005 Fernando et al. ........... 359/609
2005/0104408 A1 * 5/2005 Capps ..................... 296/97.7

* cited by examiner

*Primary Examiner*—Jordan Schwartz
*Assistant Examiner*—James C. Jones
(74) *Attorney, Agent, or Firm*—Jerome J. Norris

(57) ABSTRACT

A photochromic/vitroceramic window assembly that restores some of the natural illumination and warm blue-green colors normally excluded from the interior of an enclosed space after blocking at least a portion of infrared and/or UV light, comprising:
a) A transparent window pane;
b) a first self-adhesive material adhered to the exterior of the window pane, of a transparent plastic film containing a UV-activated photochromic dye; and
c) a second self-adhesive material adhered to the interior of the window pane, of a transparent plastic film containing i) a rare earth doped vitroceramic that up-converts any infrared not blocked by the first self-adhesive film to a warm visible blue or green color, and ii) a diarylethene that converts any UV not blocked by the first self-adhesive film to a visible yellow-white color.

13 Claims, 1 Drawing Sheet

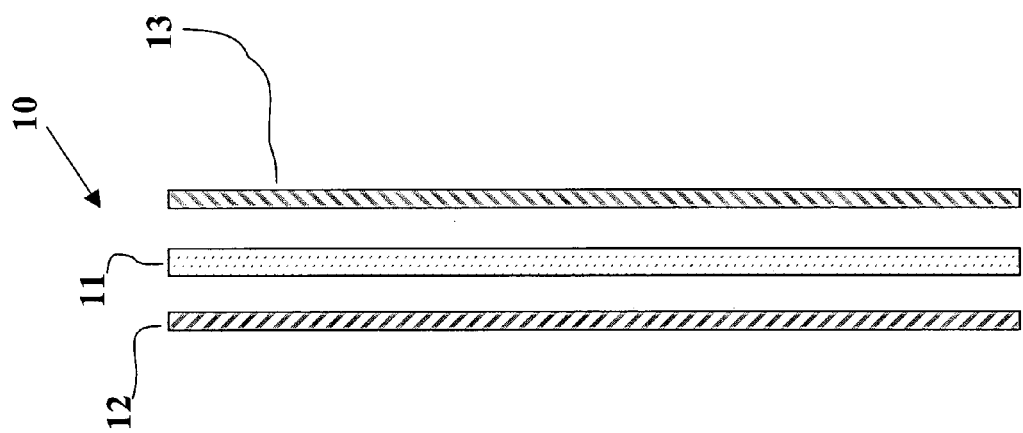

US 7,251,082 B2

PHOTOCHROMIC/VITROCERAMIC WINDOW ASSEMBLY

FIELD OF THE INVENTION

The present invention relates to photochromic/vitroceramic glass or window assemblages characterized by a first photochromic self adhesive film having the capability of blocking out at least some portion of ultraviolet and/or infra-red radiation while turning relatively darker when exposed to sunlight or exterior illumination, and subsequently turning the interior of an automobile closer to the exterior illumination or daylight when a second vitroceramic self adhesive film of the assembly transitions responsive to the darker tint that emits some portion of UV or infra-red radiation from the first photochromic film to provide visible light.

BACKGROUND OF THE INVENTION

The use of transition windows or panes in automobiles to prevent ultraviolet and infra-red solar energy penetration for purposes of enhancing user comfort and reducing power requirements for air-conditioning is known—however, the darkened interior resulting from the transition panes or windows tend to make the interior of the automobile appear dull and creates the appearance of an unnatural illumination in departure from daylight. Further, due to the desire to obtain a transmission range for photochromic windows, a sacrifice to the interior of the "warm" colors of natural light such as blue and green are surrendered upon darkening of the transition windows in the automobile. Moreover, the outside illumination to a passenger interior to the automobile gives the daylight a darker appearance that suggest a point later in time in the day than is actually the case.

THE PRIOR ART

U.S. patent application No. 20050104408 disclose a vehicle sunshade which includes a sheet of generally transparent flexible shading material which self-adheres to the interior side of a vehicle window. The sheet of shading material has a photochromic characteristic such that the sunshade turns relatively darker when exposed to sunlight and relatively lighter or more transparent when the intensity of sunlight decreases. See FIGS. 1–5. FIG. 1, an automobile or other vehicle is generally designated 10, and is represented by an interior 12. Within the automobile interior 12, an infant 14 is seated within a child safety car seat 16 located in a rear seat of the vehicle.

A selectively variable window tinting system for limiting passage of both visible light and radiative heat through an automobile window is disclosed in U.S. Pat. No. 5,587,828. Embodiments of the system include window glass assemblies which utilize photochromatic glass, electrochromatic glass, and a pair of spaced glass panes fillable with a tinted fluid. The latter embodiment also includes a plurality of differently tinted fluids which may be selectively injected between the glass panes to provide various amounts of tinting therein. See FIGS. 1–8 which show a photochromatic glass 20 which substantially darkens upon exposure to sunlight. In the preferred embodiment, the glass formulated by Corning Glass Works, Corning N.Y., under U.S. Pat. No. 4,608,349 and commercially available under its trademark "PHOTOGRAY EXTRA" meets this criteria and is suitable for use therein. In use, the glass 14–18 of the vehicle 12 will remain clear for driving during nighttime conditions, and will become tinted upon exposure to sunlight, thereby providing reduced passage of visible light and radiative heat therethrough.

U.S. Pat. No. 5,652,964 disclose a photochromatic visor for use with a crash helmet including a generally transparent plastic curved visor having an outer surface, an inner surface, and a photochromatic reagent added directly into the plastic to create a photochromatic piece, the visor further having an elongated central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, and with each tab additionally including a through hole thereon and with the through holes of the tabs removably mated with visor connector sockets of a crash helmet. See FIGS. 1 and 2.

Window tinting apparatuses is disclosed in U.S. Pat. No. 5,940,216. More particularly, the invention relates to window tinting apparatuses which comprise a first polarized panel and a movable second polarized panel which the striping (polarization) in comparison to one another is varied, thereby functioning to make the window tinting lighter or darker.

U.S. Pat. No. 6,094,290 disclose a light reactive thermal window having external and internal panes, in which the external pane is composed of photochromic glass, while the internal pane is composed of clear glass. The panes are separated by a space having a uniform thickness. Each of the panes has a peripheral edge, with a spacer located between the peripheral edges of the external and internal panes. A sealant seals the peripheral edges of the external and internal panes. The window may include a frame securing together the spacer, the sealant, and the peripheral edges of the panes. Also disclosed is a method of preventing glare on a screen while minimizing climate control costs by installing the light-reactive thermal window near the screen. See window 10 having an external pane 12 and an internal pane 14. Each pane 12 or 14 has a peripheral edge 16, an outer surface 18, and an inner surface 20. The peripheral edge 16 extends completely around each pane. The external pane 12 is composed of photochromic glass, while the internal pane 14 is composed of clear glass. A space 22 separates the external and internal panes.

A solar wind shield system for a car comprising a first transition lens material having a first darkening strength, a second transition lens material having a second darkening strength which is greater than the first darkening strength, and a third transition lens material having a third darkening strength which is greater than the second darkening strength is disclosed in U.S. Pat. No. 6,536,828

U.S. Pat. No. 6,580,472 disclose a vehicle window tinting system that includes a liquid a crystal material contained within a liquid crystal cell embedded within the side windows of a vehicle. A liquid crystal cell is likewise embedded within the vehicle rear window and is scripted to form a readable message. The liquid crystal cells are each electrically connected to the vehicle battery via a designated switch. When a switch corresponding to a window is activated, an electrical current is delivered to the liquid crystal cells thereby decreasing the transmittance of the window. If the switch corresponding to the rear window is activated, the readable message appears thereon. See FIGS. 1 through 3, which shows the window tinting system.

A chromogenic glass for use in various glazing applications, wherein a transparent chromogenic assembly in which color changes are selectively effectable over predefined areas of the assembly is disclosed in U.S. Pat. No. 6,795, 226. The assembly comprises a pair of facing glass substrates separated by an electrolyte. A conductive transparent coating is deposited on facing surfaces of the substrates, the conductive coating of at least one of the surfaces being interrupted to define individual areas, each of which is provided with a set of busbars, advantageously of silver frit. An electrochromic electrode layer overlies at least one of the conductive layers (FIGS. 1–10).

There is a need in the use of transition windows in automobiles to lessen or prevent the darkened interior resulting from the transition panes or windows that tend to make the interior of the automobile appear dull and create the appearance of unnatural illumination in departure from natural daylight.

There is a further need to eliminate sacrifice in the interior, of the "warm" colors such as green or blue of natural light normally surrendered upon darkening of the transition windows in an automobile.

Finally, there is a need, in the case of outside illumination to the passenger interior of the automobile to avoid giving the daylight a darker appearance or a later point in time in the day than is actually the case, when using transition windows in automobiles.

SUMMARY OF THE INVENTION

One object of the present invention is to provide a photochromic glass or window assemblage that prevents at least some portion of ultraviolet and infra-red solar energy penetration, while turning relatively darker when exposed to sunlight or exterior illumination and yet avoid making the interior of the automobile dull in appearance and devoid of the natural illumination from daylight.

A further object of the invention is to provide a photochromic glass or window assemblage that prevents at least some portion of ultraviolet and infra-red solar energy penetration, while turning relatively darker when exposed to sunlight or exterior illumination and yet avoid making the interior of the automobile dull in appearance and devoid of natural illumination from daylight, without sacrificing to the interior of the automobile, the "warm" colors of natural sunlight such as green or blue surrendered upon darkening of the transition windows in the automobile.

A further object of the invention is to provide a photochromic glass or window assemblage that prevents at least some portion of ultraviolet and infra-red solar energy penetration, while turning relatively darker when exposed to sunlight or exterior illumination and avoid making the interior of the automobile dull in appearance and void of natural illumination from daylight, and yet avoid the appearance of making the outside illumination to a passenger interior to the automobile darker in appearance or seem to be a point later in time in the day than is actually the case.

These and other objects of the invention will become more apparent from the brief description of the drawings and description of the preferred embodiment of the invention.

In general, the photochromic/vitroceramic window assembly that restores some of the natural illumination and warm blue-green colors normally excluded from the interior of an enclosed space after blocking at least a portion of infrared and/or UV light comprises:

a) A transparent window pane;

b) a first self-adhesive material adhered to the exterior of said window pane, of a transparent plastic film containing a UV-activated photochromic dye; and c) a second self-adhesive material adhered to the interior of said window pane, of a transparent plastic film containing i) a rare earth doped vitroceramic that up-converts any infrared not blocked by said first self-adhesive film to a warm visible blue or green color, and ii) a diarylethene that converts any UV not blocked by said first self-adhesive film to a visible yellow-white color.

BRIEF DESCRIPTION OF THE DRAWINGS

FIG. 1 is an perspective, exploded view of the photochromic/vitroceramic window assembly showing an outer self-adhesive film that prevents at least some portion of ultraviolet and infra-red solar energy penetration, while turning relatively darker when exposed to sunlight, and an inner vitroceramic self-adhesive film that transitions relatively lighter in response to the darkening of the exterior photochromic adhesive film to provide interior illumination closer to that of the outside illumination so that the inside illumination does not create a darker appearance or point later in time of the day than is actually the case.

DETAILED DESCRIPTION OF PREFERRED EMBODIMENT OF THE INVENTION

In accomplishing the objectives of the invention, reference is made to FIG. 1 wherein there is shown an exploded cross-sectional view of the photochromic/vitroceramic glass or window assemblage, generally depicted as 10. In this view, a transparent window 11 is disposed between an outer photochromic film of a self-adhesive material 12 and an interior vitroceramic film of a self-adhesive material 13. The self adhesive film 12 that self-adheres to window 11 is a photochromatic film that turns darker upon exposure to sunlight and becomes lighter or more transparent when the sunlight decreases in intensity. Accordingly, the tinting or shading effect is automatically darkened to provide a shielding or at least partial blocking of ultraviolet and infra-red rays. However, the darkened interior that results from the transition of the photochromatic self adhesive exterior film is offset by the disadvantage of making the interior of the automobile appear dull and devoid of natural illumination provided by daylight. Also, the darkened appearance in the interior of the automobile resulting from the transmission range of the exterior photochromic film of self adhesive material tends to sacrifice or surrender the "warm" colors of natural light such as green or blue upon darkening of the transition window. Further still, there is the disadvantage that inside illumination to a passenger in the interior of the automobile appears darker, thereby giving a sense of a point later in time in the day than is actually the case.

To resolve this problem, an interior film of a self-adhesive vitroceramic material, 13 is adhered to window 11.

This vitroceramic material 13 differs physically and chemically from transparent window 11 in that it is isotropic, flexible with regard to shape and it is relatively low in cost. More particularly, the vitroceramic material utilized may be fluorescent. The fluorescent material converts incident light having a wavelength in one area of the spectrum into light having a wavelength in a different area of the spectrum. That portion of the vitroceramic which is rare earth doped, when exposed to infrared light not blocked by the outer photochromic film or self adhesive material converts the infrared light into a visible blue or green color. Comcomittantly, that portion of the vitroceramic containing a diarylethene compound, when exposed to UV light not blocked by the outer photochromic film or self adhesive material converts the UV into a visible yellowish light.

The photochromic self-adhesive film 12 may comprise a transparent plastic sheet, made of polyvinyl chloride (PVC), approximately 0.0105 inches in thickness. This plastic material also incorporates an additive within itself to provide a photochromic characteristic. UV-activated photochromic dyes are employed in combination with a stabilizer for longevity. It is preferable that the dyes selected are activated at longer wavelengths transmitted through the window glass. Particular dyes and stabilizers are selected to achieve a desired ability to darken as well as stabilize over time. A dye is selected which has a residual color. Suitable photochromic dyes are commercially available. The dye in PVC may range from about 0.05% to about 1% by weight, preferably from about 0.05% up to about 0.2% by weight. Known types of stabilizers may include, and are generically known as Hindered Amine Light Stabilizer (HALS), UV absorber, and anti-oxidant. The amount of stabilizer in PVC may range from about 0.1% up to about 3% by weight, preferably from about 0.2% up to about 0.5% by weight.

The vitroceramic self-adhesive film 13 may also comprise a transparent plastic sheet made of polyvinyl chloride (PVC), approximately 0.0105 inches in thickness. The vitroceramic is obtained by mixing together one or several of the following glass-forming oxides $SiO_2$, $GeO_2$, $B_2O_3$, $P_2O_5$, $TeO_2$ with lead fluoride and high purity rare earth oxides (99.999%) of erbium, thulium, holmium, or terbium. The general formula of these materials is ($Ln_2O_3$, $Yb_2$, $O_3$, $PbF_2$, MnOm), where Ln=y, La, Gd, or Lu and M is one of the glass forming elements B, Si, P, Ge or Te. The vitroceramic mixture, contained in a platinum crucible with a cover, is heated and melted inside a muffle furnace at 1000° C. for about 1 hr. The product is obtained by pouring the melt, in air, into a graphite mold of the desired form, the mold is maintained at about 300–400° C. for 4 hr for annealing processes. A white compound with a glassy aspect is obtained.

The vitroceramic materials are powders obtained by crushing the ceramics in a mortar and sieving to various sizes. The fluorescent vitroceramic powders is mixed in the PVC in a range such that the rare earth doped vitroceramic is present in about 0.05% to about 1% by weight, preferably from about 0.05% up to about 0.2% by weight and made into a transparent plastic sheet.

The relative infrared green up-conversion efficiency for different glass-forming elements in the vitroceramics of the general formula are:

MnOm=27.18%; $PbF_2$=67.57%; $Yb_2O_3$=4.85%;

$Er_2O_3$=0.39%; (molar percent)

TABLE I

| Composition: $M_nO_m$ | Efficiency relative to $YF_3$; Yb: ER (=100)) |
|---|---|
| $B_2O_3$ | 10 |
| $TeO_2$ | 30 |
| $P_2O_3$ | 70 |
| $SiO_3$ | 65 |
| $GeO_2$ | 70 |

Forming elements have been prepared each having the same molar composition: $M_nO_m$=27.18%; $PbF_2$=67.57%; $Yb_2O_3$=4.85%; $Er_2O_3$=0.39%. The relative efficiency is given in Table I. Except for $B_2O_3$ and $TeO_2$, about the same results are obtained for the other glass-forming oxides: $P_2O_5$, $SiO_2$, and $GeO_2$.

Infrared blue up-conversion is best when the rare earth concentrations for blue are 25% $Yb_2O_3$ and 0.062% $Tm_2O_3$.

However, it is to be noted that reducing the vitroceramics to powder of 50μ grain size decreases their conversion efficiency by about 75% compared to crushed vitroceramics with grains longer than 200μ.

The self-adhesive vitroceramic containing PVC film 13 may also, contain a diarylethene compound of the formula:

FORMULA I (I)

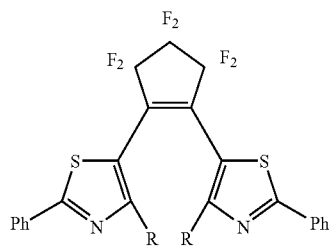

Where R is $CH_3$ or $CF_3$.

The amount of the diarylethene compound of formula I mixed into the vitroceramic should be such that diarylethene is present in the PVC in a range of from about 0.05% to about 1% by weight, preferably from about 0.05% up to about 0.2% percent by weight. Since the diarylethene is photochromic and is changed into a visible yellowish white color upon absorption of any UV rays not blocked by the outer photochromic film of self-adhesive material 12—illumination is provided to the interior of the automobile to eliminate a darker appearance than the actual day light and thereby avoid the sense normally conveyed that the time of the day is later than is actually the case in the absence of the interior vitroceramic film of self-adhesive material without the diarylethene compound.

The diarylethene compound of Formula I is converted upon UV radiation not blocked by self-adhesive film 12 into a visible yellowish white color according the equation shown below that results in Formula II:

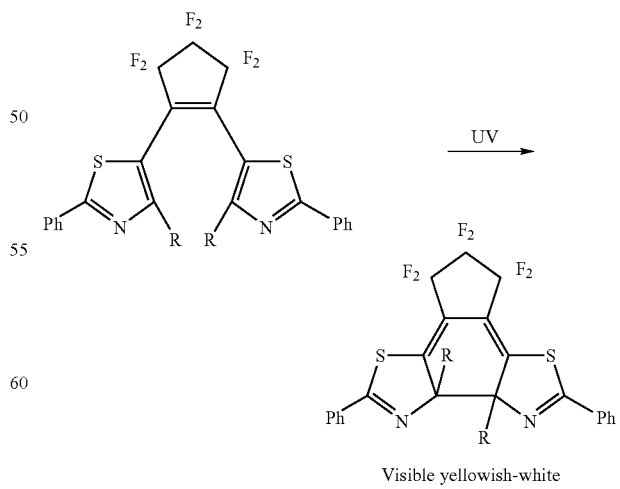

Visible yellowish-white

When UV radiation is removed or no longer coming through as unblocked UV from self adhesive film 12, formula 2 is reversed or decolorized back into Formula I.

In the context of the invention, the photochromic/vitroceramic window assembly depicted in FIG. 1 may be arranged in an alternative embodiment wherein either the vitroceramic film of self-adhesive material 13 may be positioned directly behind the photochromic film of self-adhesive material 12, or the photochromic film of self-adhesive material 12 may be positioned behind transparent window 11 and in front of the vitroceramic film of self-adhesive material 13 so that both layer 12 and 13, in that order, are positioned interior to transparent window 11.

I claim:

1. A photochromic/vitroceramic window assembly that restores some of the natural illumination and warm blue-green colors normally excluded from the interior of an enclosed space after blocking at least a portion of infrared and/or UV light, comprising:
   a) A transparent window pane;
   b) a first self-adhesive material adhered to the exterior of said window pane, of a transparent plastic film containing a UV-activated photochromic dye; and
   c) a second self-adhesive material adhered to the interior of said window pane, of a transparent plastic film containing i) a rare earth doped vitroceramic that up-converts any infrared not blocked by said first self-adhesive film to a warm visible blue or green color, and ii) a diarylethene that converts any UV not blocked by said first self-adhesive film to a visible yellow-white color.

2. The photochromic/vitroceramic window assembly of claim 1 wherein the enclosed space is the interior of an automobile.

3. The automobile of claim 2 wherein the first self-adhesive material is PVC.

4. The photochromic/vitroceramic assembly of claim 3, wherein a hindered amino light stabilizer (HALS) is present in the PVC.

5. The photochromic/vitroceramic window assembly of claim 4, wherein the transparent plastic film of the second adhesive material is PVC.

6. The photochromic/vitroceramic window assembly of claim 5, wherein the PVC of the second self-adhesive material contains a mixture of a glass-forming oxide with lead fluoride and a high purity rare earth oxide; said high purity rare earth oxide being 99.999% and a diethene compound of the formula:

(I)

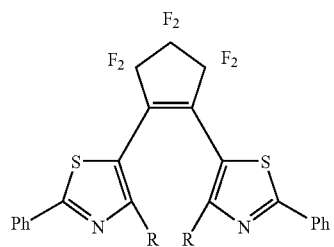

Where R is $CH_3$ or $CF_3$.

7. The photochromic/vitroceramic window assembly of claim 6, wherein the vitroceramic is of the formula $Ln_2O_3$, $Yb_2O_3$, $PbF_2$ and MnOm doped with oxides selected from the group consisting of erbium, thulium, holmium, or terbium with Ln=y, La, Gd, or Lu, and wherein M is selected from the group consisting of B, Si, P, Ge, or TE.

8. The photochromic/vitroceramic window assembly of claim 7, wherein the vitroceramic is a powder having a grain size of between 50μ and 2000μ.

9. The photochromic/vitroceramic window assembly of claim 7 wherein the vitroceramic is a powder having a grain size longer than 200μ.

10. A photochromic/vitroceramic window assembly that restores some of the natural illumination and warm blue-green colors normally excluded from the interior of an enclosed space after blocking at least a portion of infrared and/or UV light, comprising:
    a) A transparent window pane;
    b) a first self-adhesive material adhered to the interior of said window pane, of a transparent plastic film containing a UV-activated photochromic dye; and
    c) a second self-adhesive material adhered to the first self-adhesive material;
    said second self adhesive material comprising a transparent plastic film containing i) a rare earth doped vitroceramic that up-converts any infrared not blocked by said first self-adhesive film to a warm visible blue or green color, and ii) a diarylethene that converts any UV not blocked by said first self-adhesive film to a visible yellow-white color.

11. The photochromic/vitroceramic window assembly of claim 10 wherein the enclosed space is the interior of an automobile.

12. A photochromic/vitroceramic window assembly that restores some of the natural illumination and warm blue-green colors normally excluded from the interior of an enclosed space after blocking at least a portion of infrared and/or UV light, comprising:
    a) A transparent window pane; and
    b) a first self-adhesive material adhered to a second self-adhesive material to form a bi-layer; said bi-layer being positioned in front of the transparent window pane so that the second self adhesive material is directly next to said transparent window pane; and wherein: i) said first self-adhesive material comprises a transparent plastic film containing a UV-activated photochromic dye; and ii) said second self-adhesive material comprises a transparent plastic film containing iii) a rare earth doped vitroceramic that up-converts any infrared not blocked by said first self-adhesive film to a warm visible blue or green color, and iv) a diarylethene that converts any UV not blocked by said first self-adhesive film to a visible yellow-white color.

13. The photochromic/vitroceramic window assembly of claim 12 wherein the enclosed space is the interior of an automobile.

* * * * *